United States Patent [19]
Stoever

[11] Patent Number: 5,377,801
[45] Date of Patent: Jan. 3, 1995

[54] CONTROL APPARATUS FOR A TRANSMISSION AND THE LIKE

[75] Inventor: Guy T. Stoever, Naperville, Ill.

[73] Assignee: Case Corporation, Racine, Wis.

[21] Appl. No.: 987,615

[22] Filed: Dec. 9, 1992

[51] Int. Cl.⁶ ............................................. F16D 25/11
[52] U.S. Cl. ................................. 192/87.13; 74/335
[58] Field of Search .............. 192/87.13; 74/335;
137/625.69, 625.64; 91/522, 529, 531, 447

[56] References Cited

U.S. PATENT DOCUMENTS

| | | | |
|---|---|---|---|
| 4,046,160 | 9/1977 | Horsch | 192/87.13 X |
| 4,102,132 | 7/1978 | Palmer | |
| 4,308,764 | 1/1982 | Kawamoto et al. | |
| 4,351,206 | 9/1982 | Lemieux et al. | |
| 4,643,285 | 2/1987 | Horsch | 192/87.13 |
| 4,653,352 | 3/1987 | Nakao et al. | 74/335 X |
| 4,674,345 | 6/1987 | Furukawa et al. | 74/335 |
| 4,716,933 | 1/1988 | Stoever et al. | 91/447 X |
| 4,838,126 | 6/1989 | Wilfinger et al. | |
| 4,877,116 | 10/1989 | Horsch | |
| 5,038,671 | 8/1991 | Ueno | 91/531 X |

Primary Examiner—Rodney H. Bonck
Attorney, Agent, or Firm—Rudnick & Wolfe

[57] ABSTRACT

A control apparatus for selectively operating any one of at least three fluid pressure operated devices at any given time. The control system includes first and second valves arranged in combination with each other and which are hydraulically interposed between a fluid pressure source and each of the fluid operated devices. Each valve is shiftable between first and second positions. Hydraulic logic circuitry selectively connects the first valve to the fluid operated devices and selectively connects the second valve to the first valve whereby, for any one position of the two valves, only one of the fluid operated devices is connected to the fluid pressure source while the remainder of the fluid operated devices are open to exhaust. First and second ON/OFF solenoid operated valves facilitate positioning of the first and second valves in response to electrical signals received by the ON/OFF valves.

1 Claim, 2 Drawing Sheets

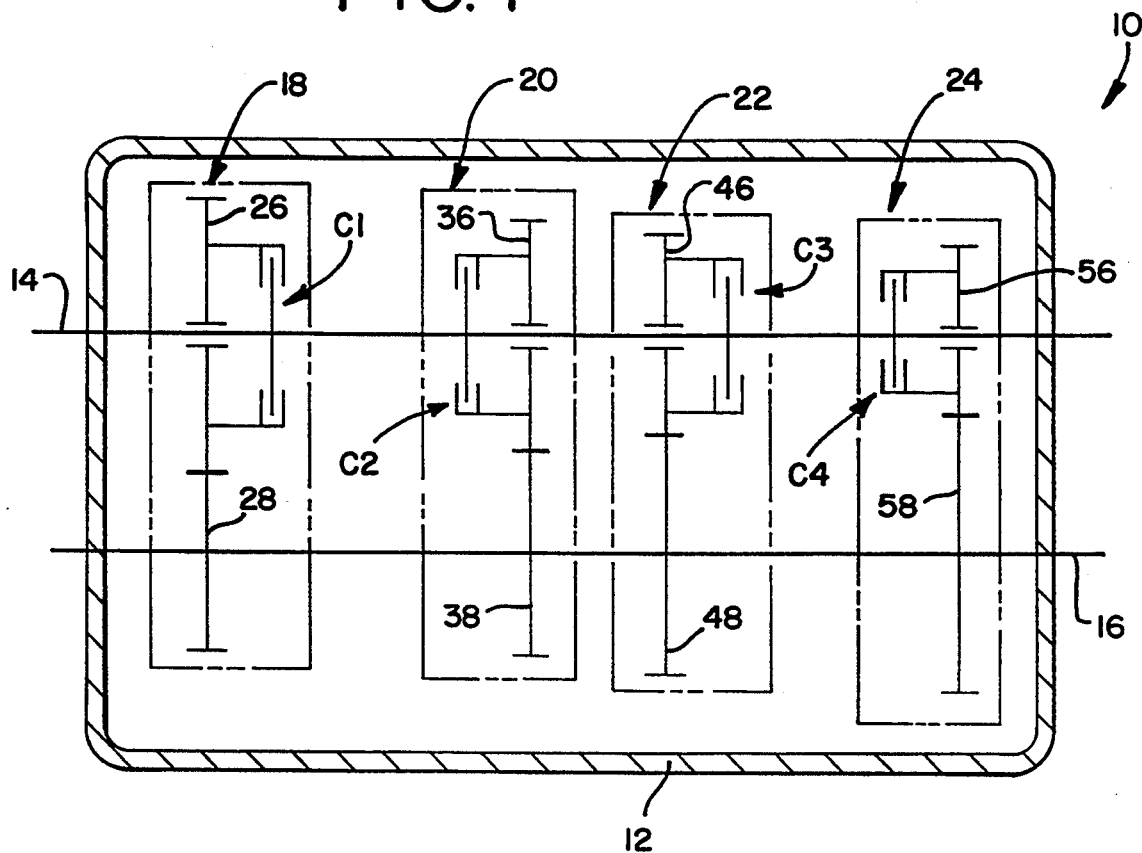

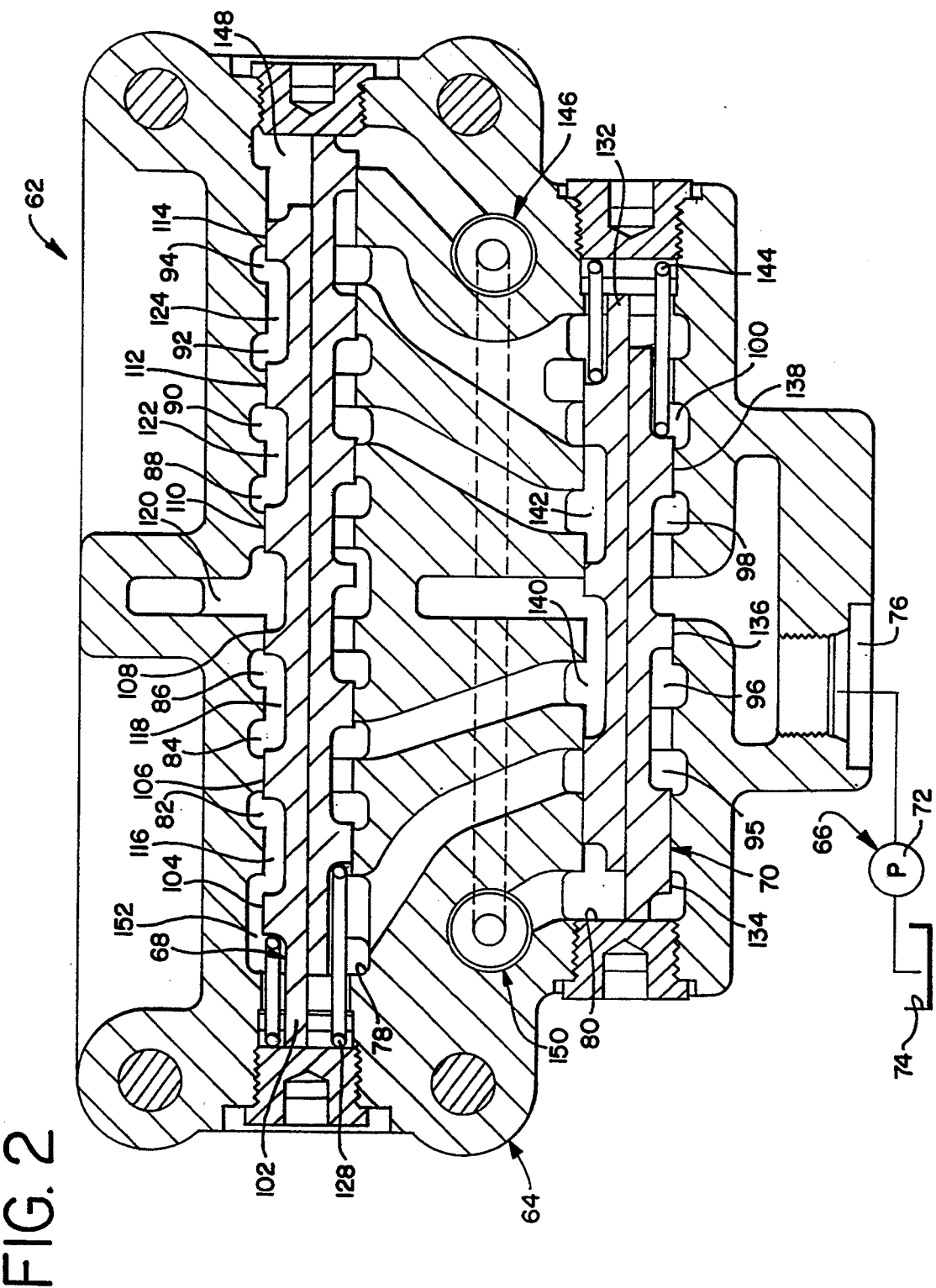

CONTROL APPARATUS FOR A TRANSMISSION AND THE LIKE

FIELD OF THE INVENTION

The present invention generally relates to a control apparatus and, more particularly, to an apparatus for controlling operation of only one of at least three hydraulically operated actuators at any given time during operation of a mechanism controlled by such actuators.

BACKGROUND OF THE INVENTION

Several different mechanisms rely on a series of hydraulically operated actuators for accomplishing a desired result. For example, a multi-speed transmission typically includes plural torque delivery paths between driving and driven members. A plurality of hydraulically operated clutch assemblies control relative motion of various gear elements forming the torque delivery paths in the transmission. Actuation of a particular clutch assembly controls which path is conditioned to deliver torque and power between the drive and driven members.

As will be appreciated, simultaneous engagement of more than one clutch assembly at any given time causes severe problems within the transmission often resulting in extensive damage to the clutch assemblies and related components. Therefore, each transmission clutch assembly is typically controlled by its own solenoid valve. The function of the solenoid valve is to provide actuating fluid to a respective clutch when the valve is energized and allow the clutch to be connected to exhaust upon de-energization of the valve.

Although each clutch assembly is provided with its own solenoid valve, problems still persist. Because each clutch assembly has its own solenoid valve, the possibility exists that more than one clutch assembly can be pressurized at one time as a result of a mechanical or electrical failure with the valve. To reduce this problem from occurring, individual pressure switches are provided to sense when the clutches are pressurized. The function of the pressure switches are such that if more than one pressure switch detects hydraulic pressure in a clutch assembly, a control module will disconnect the power supply to all of the solenoids. Disconnecting the power to all of the solenoids automatically conditions the transmission in a "Neutral" mode of operation.

Providing separate solenoid valves for each clutch assembly adds substantially to the cost of the transmission. Moreover, the addition of separate pressure switches for detecting which clutch assembly is activated adds still further costs to the transmission. Transmissions used on off-highway equipment are often subject to brutal field conditions. Such field conditions can and often do cause one or more of the solenoid valves, one or more of the pressure switches, or any combination thereof to malfunction and/or fail thereby conditioning the transmission in "Neutral". Of course, with the transmission in "Neutral" the equipment or apparatus is essentially useless. Thus, repair time is required to fix or repair the malfunctioning parts.

Thus, there is a need and a desire for a control system which eliminates redundant parts while assuring that only one hydraulic actuator will be operated at any given time. When installed in combination with a transmission, the control system should be designed such that a mechanical or electrical failure will nevertheless allow the transfer of power through the transmission to enable the equipment driven thereby to be moved to a suitable location for repair.

SUMMARY OF THE INVENTION

In view of the above, and in accordance with the present invention, there is provided a control apparatus for selectively operating any one of at least three fluid pressure operated devices at any given time. The control system includes first and second valves arranged in combination with each other and which are hydraulically disposed between a fluid pressure source and each of the fluid pressure operated devices. Each valve is shiftable between first and second positions. Hydraulic logic circuitry selectively connects the first valve to the fluid operated devices and selectively connects the second valve to different ports of the first valve whereby, for any one position of each valve, one of the fluid operated devices receives actuating fluid while the remainder of the fluid operated devices are connected to exhaust thereby providing that only one fluid operated device is actuated at any given time of operation.

In a first position, the first valve directs actuating fluid to the first fluid pressure operated device while connecting the second and third devices to exhaust. In a second position, the first valve connects the first and third pressure operated devices to exhaust while directing actuating fluid to the second fluid operated device. When in a first position, the second valve directs fluid pressure to the first valve such that either the first or second fluid operated devices are actuated depending upon the position of the first valve while allowing at least one of the fluid pressure operated devices to be exhausted through the second valve. In the second position, the second valve directs actuating fluid to the first valve such that the third fluid operated device is actuated while at least one of the remaining fluid operated devices is exhausted through the second valve. With the present invention, different positional combinations of the first and second valves allows only one of the three fluid operated devices to be actuated while connecting the remaining two fluid operated devices to exhaust thereby eliminating inadvertent engagement of more than one fluid operated device at any given time.

The first and second valves are each shiftable between their respective positions under the influence of an actuation assembly. In a most preferred form of the invention, the actuation assembly comprises first and second fluid pressure actuators. Each fluid pressure actuator is preferably in the form of an ON/OFF solenoid valve operated in response to signals received from an operator.

In a most preferred form of the invention, the first and second valves of the control assembly are each biased toward one position under the influence of a spring. Thus, if either one or both of the solenoid valves fail, the combination of the first and second valves will allow actuating fluid to be delivered to at least one of the fluid operated devices thus enabling limited operation of the mechanism with which the fluid pressure operated devices are associated.

In the embodiment of the invention illustrated, the control apparatus is arranged in combination with a multi-speed transmission adapted to deliver torque from a driving member to a driven member. The transmission has gear elements forming plural torque delivery paths between the driving and driven members and a plurality of clutches for controlling the relative motion of the gear elements to provide a plurality of different speed ratios. A first fluid circuit delivers actuating fluid from a fluid source to a first clutch to establish a first speed ratio. A second fluid circuit delivers actuating fluid from the fluid source to a second clutch to establish a second speed ratio. A third fluid circuit delivers actuating fluid from the fluid source to a third clutch to establish a third speed ratio. A fourth fluid circuit delivers actuating fluid from the fluid source to a fourth clutch to establish a fourth speed ratio.

A first ported valve is interposed between the fluid source and each of the fluid circuits. The first valve is shiftable from a first position whereat actuating fluid from the fluid source is delivered through the first circuit to the first clutch to allow for operation of the transmission in the first gear ratio while the remaining circuits are open to exhaust. When the first valve is shifted from the first position to a second position actuating fluid from the fluid source is delivered through the second circuit to the second clutch to allow for operation of the transmission in the second gear ratio while the remaining circuits are open to exhaust.

A second valve is interposed between the fluid source and the first valve and is shiftable between two positions. When the second valve is in a first position, actuating fluid is presented to a port of the first valve such that actuating fluid is directed through the third circuit to the third clutch to allow for operation of the transmission in the third gear ratio while the remaining circuits are open to exhaust. When the second valve is in a second position, actuating fluid is presented to a port of the first valve such that actuating fluid is directed through the fourth circuit to the fourth clutch to allow for operation of the transmission in the fourth gear ratio while the remaining circuits are open to exhaust. The engagement of any one clutch coupled with the connection of the remaining circuits to exhaust allows for operation of the transmission in only one gear ratio at a time and prevents inadvertent engagement of more than one clutch at any given time of transmission operation.

Unlike other more complicated systems which have dedicated spools and valves for each fluid operated motor or device, the control system of the present invention has a lesser number of valves than the number of fluid actuated devices actuated thereby and advantageously allows only one of the fluid operated devices to be operated at any given time. Moreover, the logic circuitry of the present invention assures that at least one fluid operated device is operated notwithstanding malfunctions or failure of the solenoid valves preferably used to position the valves during operation of the control system. Because only one fluid operated device can be actuated at any time, the control system of the present invention eliminates the need for any other type of protection device that would indicate if more than one fluid operated device is simultaneously actuated therewith. Thus, there is a significant reduction of parts with the present invention thereby allowing the control system to be more economical than heretofore known devices used to actuate fluid operated devices.

Numerous other features and advantages of the present invention will become readily apparent from the following detailed description, the accompanying drawings, and the appended claims.

BRIEF DESCRIPTION OF THE DRAWINGS

FIG. 1 is a schematic illustration of a transmission with which the control system of the present invention finds utility;

FIG. 2 is a sectional view of a valve body embodying principles of the present invention; and FIG. 3 is a schematic illustration of the control system of the present invention.

DETAILED DESCRIPTION OF THE PRESENT INVENTION

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

FIG. 1 schematically illustrates a transmission 10 with which the present invention finds utility. It should be appreciated, however, that the present invention is equally applicable to other devices which use three or more hydraulically operated actuators for operating various components and wherein only one hydraulic actuator is to be enabled or actuated at any given time.

The transmission 10, shown for purposes of illustration, includes a housing 12 which is adapted for connection to a suitable source of power, i.e., an engine (not shown) and which rotatably supports a driving member 14 and a driven member 16. Interposed between the driving and driven members 14 and 16, respectively, are a series of four clutch operated drive gear assemblies 18, 20, 22, and 24 forming plural torque delivery paths therebetween.

Gear assembly 18 includes at least two gear elements 26 and 28. As shown, gear element 26 is rotatably mounted on shaft 14 while gear element 28 is fixed to rotate with shaft or driven member 16. The gear assembly 18 further includes a conventional hydraulically actuated clutch assembly C1 which selectively connects gear element 26 to shaft 14 thereby establishing a first gear ratio between the drive and driven members 14 and 16, respectively.

Gear assembly 20 likewise includes at least two gear elements 36 and 38. As shown, gear element 36 is rotatably mounted on shaft 14 while gear element 38 is fixed to the shaft or driven member 16. Gear assembly 20 further includes a conventional hydraulically actuated clutch assembly C2 for selectively connecting gear 36 to shaft 14 and thereby establishing a second gear ratio between the drive and driven members 14 and 16, respectively.

Gear assembly 22 likewise includes at least two gear elements 46 and 48. As shown, gear element 46 is rotatably mounted on shaft 14 while gear element 48 is fixed to shaft or driven member 16 for rotation therewith. Gear assembly 22 further includes a conventional hydraulically actuated clutch assembly C3 which selectively connects gear element 46 to shaft 14 thereby establishing a third gear ratio between the drive and driven members 14 and 16, respectively.

Similarly, gear assembly 24 includes at least two gear elements 56 and 58. As shown, gear element 56 is rotatably mounted on shaft 14 while gear element 58 is affixed to the shaft or driven member 16 for rotation therewith. Gear assembly 24 further includes a conventional hydraulically actuated clutch assembly C4 which selectively couples gear element 56 to shaft 14 to establish a fourth gear ratio between the drive and driven members 14 and 16, respectively.

Actuating fluid is supplied to and exhausted from the four clutches of the transmission 10 through means of a control apparatus 62 one embodiment of which is schematically shown in FIG. 2. A salient feature of the control apparatus 62 is that only one of the four hydraulically actuated clutches in the transmission can be applied or actuated at any given time thereby reducing the opportunity for inadvertent damage to the gear assemblies and other transmission components. Although the control apparatus 62 is schematically illustrated to control actuation of four fluid operated devices, it will be appreciated that with slight redesign efforts the control apparatus 62 could readily be used to control three fluid operated devices.

In the illustrated embodiment, the control apparatus 62 includes a valve body 64 which is suited for connection to a fluid pressure source 66 and includes a first valve 68, a second valve 70, and hydraulic logic circuitry for individually connecting the fluid pressure source 66 to each of the fluid operated clutch assemblies through selective positioning of the first and second valves 68 and 70, respectively, such that for any one position of each of the first and second valves one of the clutch assemblies in the transmission receives actuating fluid while the remainder of the clutch assemblies are connected to exhaust thereby providing that only one clutch assembly is actuated at any given time of operation.

The source of fluid pressure 66 preferably includes a conventional fixed displacement gear type pump 72. During operation, pump 72 withdraws fluid from a reservoir 74 and provides actuating fluid at a suitable operating pressure to an inlet port 76 of valve body 64.

Valve body 64 is preferably configured for attachment to the transmission housing 12 and includes a first valve bore 78 and a second valve bore 80. Valve body 64 further provides a plurality of ports 82, 84, 86, 88, 90, 92 and 94 spaced axially along the length of valve bore 78. Notably, ports 82, 86, 88, and 92 act as outlet ports which open valve bore 78 to clutch assemblies C1, C2, C3 and C4, respectively. Valve body 64 further defines a plurality of ports 95, 96, 98, and 100 spaced axially along the length of valve bore 80. Notably, ports 84 and 96 of valve bores 78 and 80, respectively, are interconnected. Moreover, ports 90 and 98 of valve bores 78 and 80, respectively, are likewise interconnected.

The first valve 68 includes a valve spool 102 which is linearly movable between first and second positions and is guided within the valve bore 78. Valve spool 102 defines a series of axially spaced lands 104, 106, 108, 110, 112, and 114 therealong with annular grooves 116, 118, 120, 122 and 124 between the lands, respectively. In the illustrated embodiment, spool 102 is resiliently biased to the right, as shown in lower portion of spool 102 in FIG. 2, and into a first position under the influence of a spring 128.

The second valve 70 includes a valve spool 132 which is linearly movable between first and second positions and is guided within valve bore 80. Valve spool 132 defines a series of axially spaced lands 134, 136, and 138 therealong with annular grooves 140 and 142 between the lands, respectively. In the illustrated embodiment, spool 132 is resiliently biased to the left and into a first position, as illustrated in its lower portion of spool 132 in FIG. 2, under the influence of a spring 144.

A first solenoid operated ON/OFF valve 146 is preferably used to shift valve 68 against the action of spring 128 from a first position (shown in the lower portion of FIG. 2) to a second position (shown in the upper portion of FIG. 2). The solenoid valve 146 preferably receives actuating fluid from the fluid pressure source 66 and selectively directs pressurized fluid to a fluid receiving chamber 148 defined by valve body 64 at one end of the valve spool 102.

A second solenoid operated ON/OFF valve 150 is preferably used to shift the second valve 70 against the action of spring 144 from a first position (shown in the lower portion of FIG. 2) to a second position (shown in the upper portion of FIG. 2). The solenoid valve 150 preferably receives actuating fluid pressure from the fluid pressure source 66 and selectively directs fluid to a fluid receiving chamber 152 defined by valve body 64 preferably at one end of valve spool 132. Both ON/OFF valves 146 and 150 incorporate a conventional design and are controlled in response to electrical signals directed thereto by the operator at a location which can be remote from the valves.

A first fluid circuit for delivering actuating fluid to the first clutch assembly C1 is defined by interconnecting select ports in the valve body 64. In the illustrated embodiment, the first fluid circuit is established when inlet port 76 is fluidically interconnected to the outlet port 82 for the clutch assembly C1 by allowing actuating fluid flow between ports 84 and 96. Notably, actuating fluid flow through the first fluid circuit is controlled as a function of the position of valves 68 and 70 which are hydraulically interposed between inlet port 76 and outlet port 82.

A second fluid circuit for delivering actuator fluid to the second clutch assembly C2 is defined by interconnecting select ports in valve body 64. In the illustrated embodiment, the second fluid circuit is established when inlet port 76 is fluidically interconnected to the outlet port 86 for the clutch assembly C2 by allowing actuating fluid flow between ports 84 and 96. Notably, actuating fluid flow through the second fluid circuit is likewise controlled as a function of the position of valves 68 and 70 hydraulically interposed between inlet port 76 and outlet port 86.

A third fluid circuit for delivering actuator fluid to the third clutch assembly 50 is defined by interconnecting other select ports in the valve body 64. In the illustrated embodiment, the third fluid circuit is established when inlet port 76 is fluidically interconnected to the outlet port 88 for the clutch assembly C3 by allowing actuating fluid flow between ports 90 and 98. Actuating fluid flow through the third fluid circuit is also controlled as a function of the linear positions of valve 68 and 70 hydraulically interposed between inlet port 76 and outlet port 88.

Similarly, a fourth fluid circuit for delivering actuating fluid to the fourth clutch assembly C4 is defined by interconnecting select ports in the valve body 64. In the illustrated embodiment, the fourth fluid circuit is established when inlet port 76 is fluidically interconnected to the outlet port 92 for the clutch assembly C4 by allowing actuating fluid flow between ports 90 and 98. Actuating fluid flow through the fourth fluid circuit is controlled as a function of the linear positions of valves 68 and 70 hydraulically interposed between inlet port 76 and outlet port 92.

As will be appreciated from a complete understanding of the invention, the hydraulic logic circuitry of this invention allows only one clutch to be actuated at any given time while the remaining clutches are connected to exhaust. To actuate clutch assembly C1, for example, valve 68 is required to be shifted to the right as seen in the lower portion of FIG. 2, while valve 70 is required to likewise be shifted to the right as shown in the upper portion of FIG. 2.

To facilitate positioning of the valves 68 and 70 in a manner actuating the first clutch assembly C1, and as shown in the logic diagram of FIG. 3, the ON/OFF solenoid 146 is switched to OFF to inhibit fluid flow into chamber 148 thus allowing spring 128 to position valve 68 to the right while the ON/OFF solenoid valve 150 is switched to ON allowing fluid into chamber 152 and thus urging valve 70 to the right against the action of spring 144. It should be appreciated that the actuated state of the ON/OFF valves 146 and 150 is exemplary and can be reversed to condition fluid flow in a similar manner without departing or detracting from the spirit and scope of the present invention.

With the valves 68 and 70 so positioned, fluid flows through the first circuit to the first clutch assembly C1. More specifically, fluid flows from inlet port 76, across annular groove 140 of valve spool 132, into port 96 from whence fluid flows to port 84 and across the annular groove 116 of valve spool 102 and to the outlet port 82 to actuate the first clutch assembly C1. Notably, lands 134 and 136 of valve spool 132 cooperate with the valve bore 80 to close clutch assembly C1 from exhaust and inhibit actuating fluid flow from inlet port 76 into ports 95 and 98, respectively, when valve 70 is positioned to actuate the first clutch C1. Likewise, lands 104 and 106 on valve spool 102 inhibit actuating fluid flow into the chamber 152 and into outlet port 86 when valve 68 is positioned to actuate the first clutch assembly C1. The other outlet ports 86, 88 and 92 and the clutches C2, C3 and C4, respectively, are all connected to exhaust through suitable passages defined the valve body 64.

Actuation of clutches C2, C3 and C4 is likewise accomplished by selectively positioning the valves 68 and 70 thus connecting any one of the four fluid circuits of the hydraulic logic to the fluid pressure source while simultaneously connecting the remainder of the circuits to exhaust. As will be appreciated, various lands on the valves 68, 70 cooperate with the respective valve bores 78, 80 to properly direct the fluid between the fluid circuits. An important and advantageous feature of the present invention is that only two selectively positionable valves 68 and 70 are utilized to control actuation of four clutches C1, C2, C3 and C4. The two solenoids 148 and 150 facilitate remote actuation of the valves 68 and 70 through electronic signals controlled by the operator.

With the present invention, there is no need for dedicated solenoid valves for each of the fluid operated devices. Thus, there is a manufacturing cost savings. Moreover, because the present invention allows only one fluid operated device to be actuated at any given time, there is no need for costly protection devices such as pressure actuating switches. Thus, the present invention offers not only cost savings but a reduction in the number of parts required in the transmission or other suitably controlled mechanism. An important advantage of the present invention is that the logic circuitry of the present invention allows at least one of the clutch assemblies to be actuated even if there is a malfunction with the valves 68, 70 or the solenoid valves 146 and 150. Thus, notwithstanding the presence of a malfunction, the control system allows transfer of power notwithstanding the presence of a malfunction or disablement of the control system.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. An electro/hydraulic control apparatus for selectively operating a multi-speed transmission of an off-highway implement by controlling any one of four fluid pressure operated mechanisms arranged in combination with the transmission of the off-highway implement at any given time, said control apparatus comprising:

a fluid pressure source;

a valve body having an inlet passage connected to said fluid pressure source, first elongated valve bore having four motor ports arranged in axially adjacent relationship along the length of said first valve bore, with each motor port being connected to one of said fluid pressure operated mechanisms, a first inlet port provided along the length of said first valve bore between two axially adjacent motor ports, a second inlet port provided along the length of said first valve bore between two other axially adjacent motor ports, and a second elongated valve bore extending generally parallel to said first valve bore and having first and second ports axially arranged along the length of said second valve bore on opposite sides of said inlet passage, the first port of said second valve bore having arranged in fluid communication with said first inlet port of said first valve bore and with said second port of said second valve bore arranged in fluid communication with said second inlet port of said first valve bore, and wherein said second valve bore further includes two axially spaced exhaust ports;

a first valve mounted for linear reciprocation between first and second positions within said first valve bore, said first valve being hydraulically interposed between the inlet and outlet ports of said first valve bore, wherein in a first position said first valve directs actuating fluid from one of the inlet ports in to a first of said motor ports to effect operation of a first fluid pressure operated mechanism while connecting the remaining motor ports to exhaust thereby disabling the remaining fluid pressure operated mechanisms from conditioning the transmission for operation, and wherein in a second position said first valve directs actuating fluid from the other inlet port in the first valve bore to a second of said motor ports to effect operation of a second fluid pressure operated mechanism while connecting tile remaining motor ports to exhaust thereby disabling the remaining fluid pressure operated mechanisms from conditioning the transmission for operation;

a first solenoid valve connected to said fluid pressure source for controlling the position said first valve in response to electrical signals received from an operator:

a second valve mounted for linear reciprocation between first and second positions in said second valve bore, said second valve being hydraulically interposed between said inlet passage in tile valve body and said first and second ports of said second valve bore, wherein said first position said second valve directs actuating fluid to an inlet port of said first valve bore from whence the actuating fluid is directed to the third motor port to effect operation of a third fluid pressure operated mechanism while the remaining motor ports are connected to exhaust thereby disabling the remaining fluid pressure operated mechanisms from conditioning operation, and wherein a second position said second valve directs actuating fluid to the other inlet port of said first valve bore from whence the actuating fluid is directed to the fourth motor port to effect operation of a fourth fluid pressure operated mechanism while the remaining motor ports are connected to exhaust thereby disabling the remaining fluid pressure operated mechanisms from conditioning the transmission for operation;

a second solenoid valve connected to the fluid pressure source for controlling the position of the second valve in response to electrical signals received from the operator; and said first and second valves and said first and second solenoid valves being the only valves affecting fluid pressure between said source and said fluid pressure operated mechanisms; and first and second springs for linearly biasing said first and second valves, respectively, positions whereby allowing actuating fluid to flow through the valve body thereby assuring operation of at least one of said fluid pressure operated mechanisms thus enabling transmission operation notwithstanding failure of one or both solenoid valves.

* * * * *

UNITED STATES PATENT AND TRADEMARK OFFICE
CERTIFICATE OF CORRECTION

PATENT NO. : 5,377,801

DATED : January 3, 1995

INVENTOR(S) : Guy Thomas Stoever

It is certified that error appears in the above-identified patent and that said Letters Patent is hereby corrected as shown below:

Col. 8, line 25, before "first" insert --a--;

Col. 8, line 39, "having" should be --being--;

Col. 8, line 53, before "to" (1st occurrence) insert --the first valve bore--

Col. 8, line 63, "tile" should be --the--;

Col. 8, line 68, before "said" insert --of--;

Col. 9, line 6, "tile" should be --the--;

Col. 9, line 15, after "conditioning" insert --the transmission for--;

Col. 10, line 14, before "positions" insert --toward preset--.

Signed and Sealed this

Eighteenth Day of June, 1996

Attest:

BRUCE LEHMAN

*Attesting Officer*  *Commissioner of Patents and Trademarks*